Jan. 4, 1955 R. KRESS 2,698,605
PNEUMATIC BOOSTER
Filed Aug. 11, 1950 5 Sheets-Sheet 2
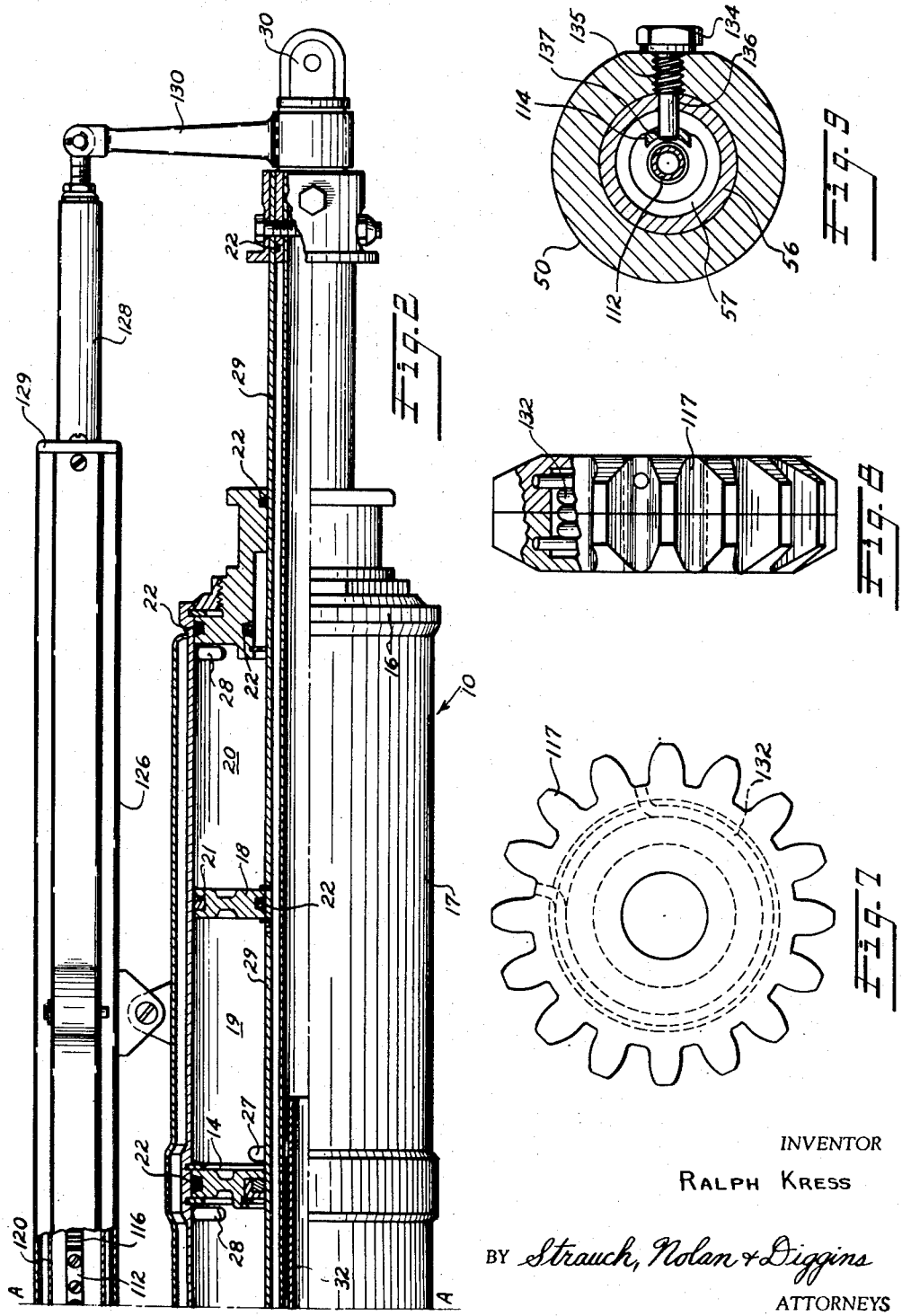
INVENTOR
RALPH KRESS
BY Strauch, Nolan & Diggins
ATTORNEYS

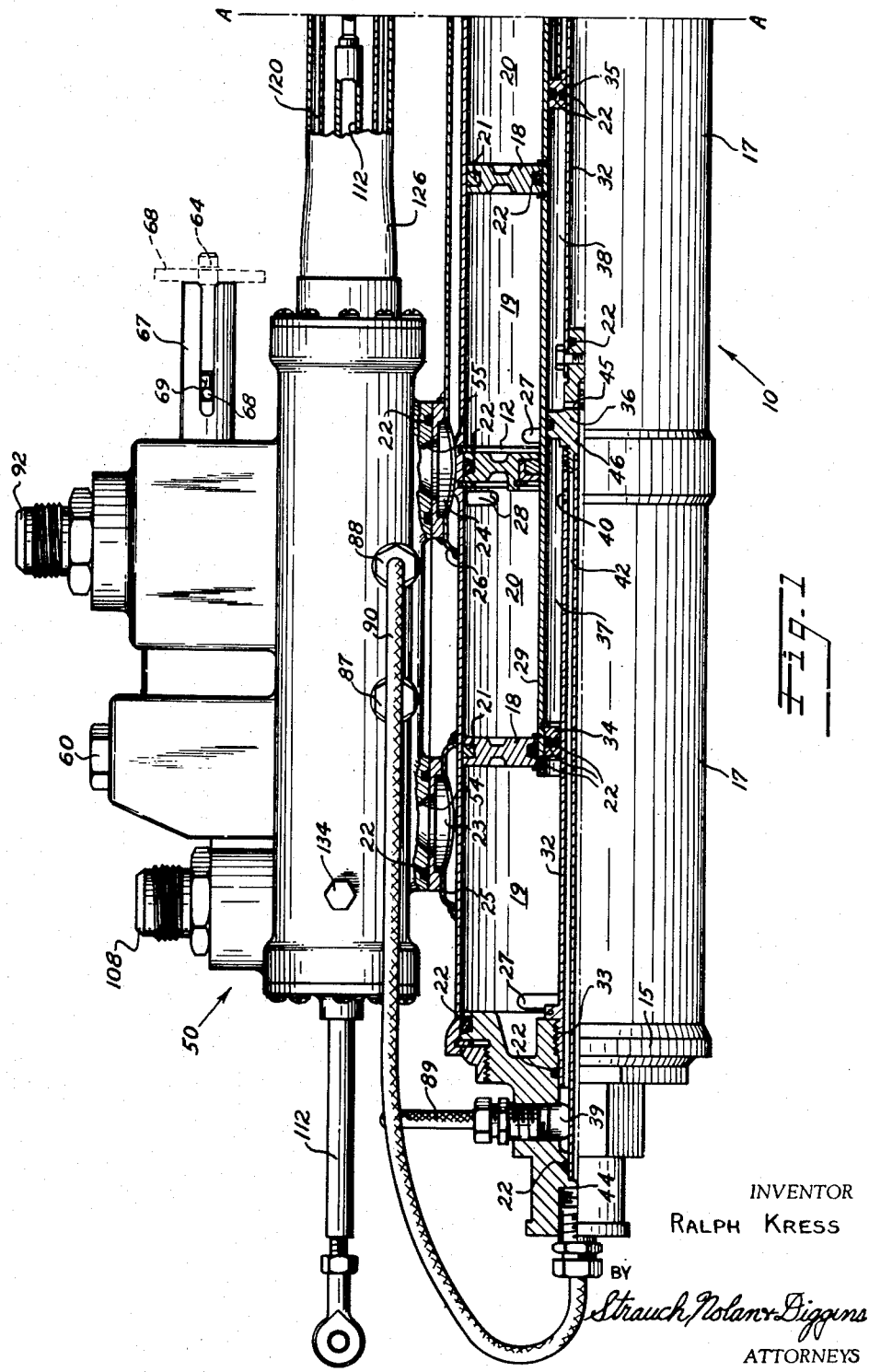

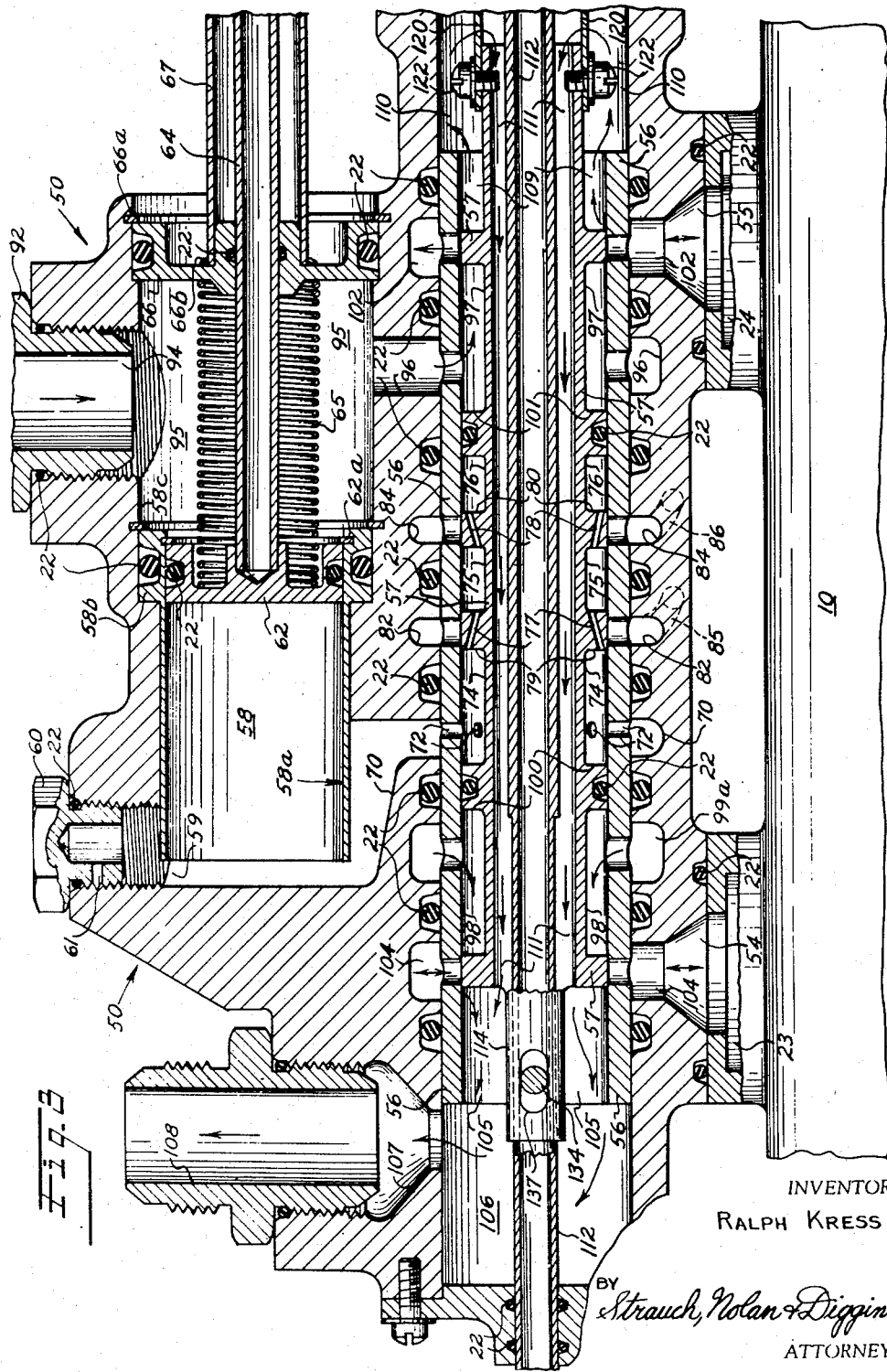

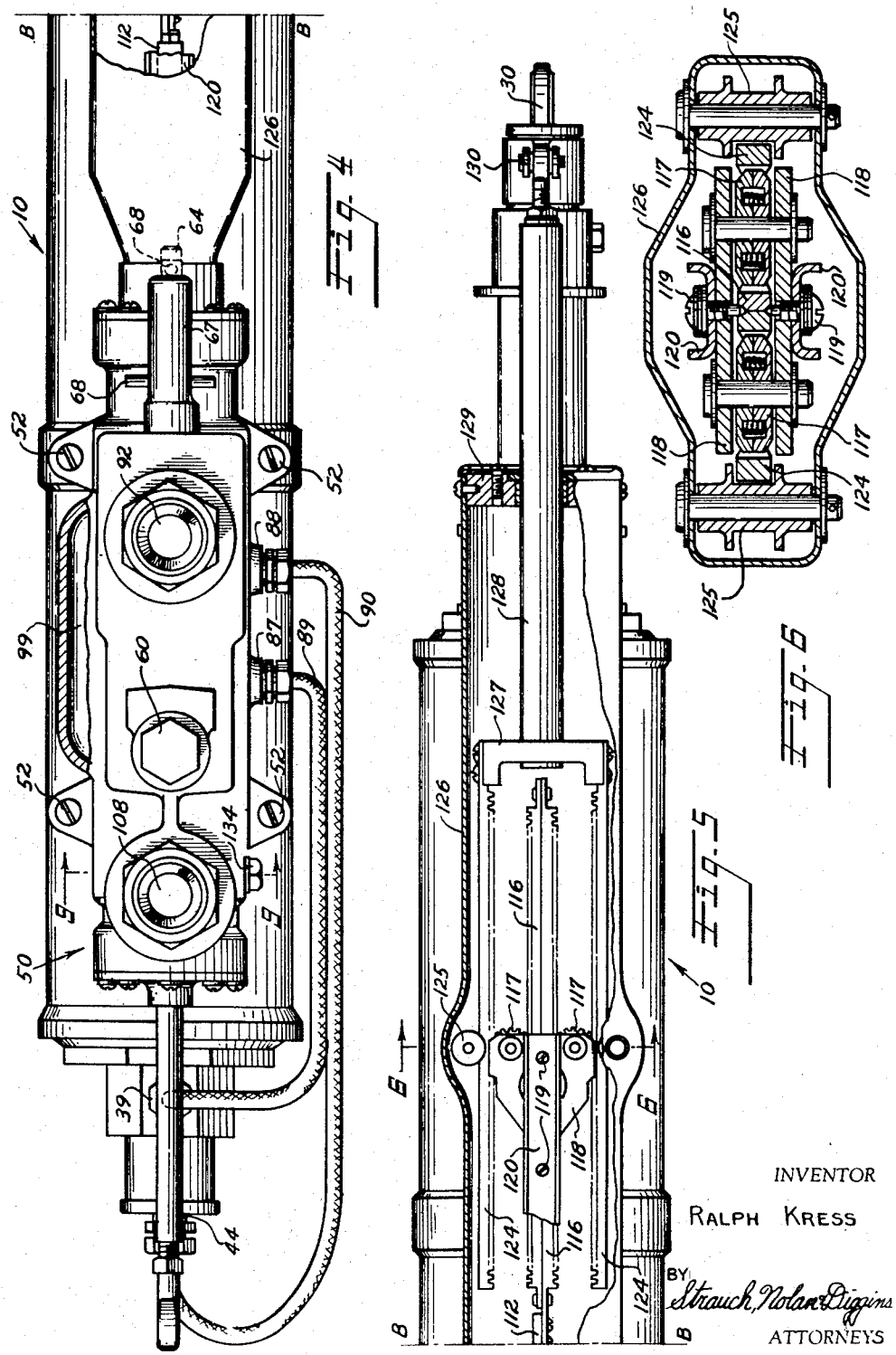

Jan. 4, 1955 — R. KRESS — 2,698,605
PNEUMATIC BOOSTER
Filed Aug. 11, 1950 — 5 Sheets-Sheet 5
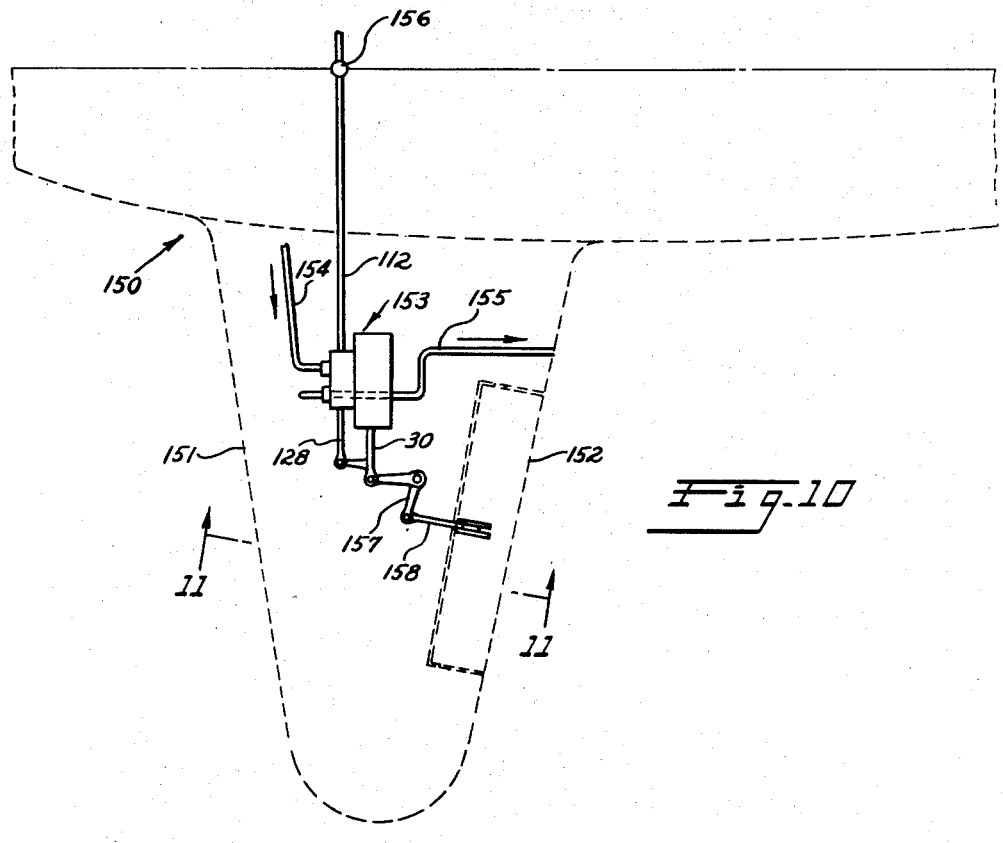
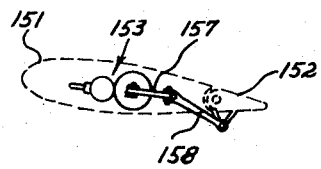
INVENTOR
RALPH KRESS
BY *Strauch, Nolan & Diggins*
ATTORNEYS

United States Patent Office 2,698,605
Patented Jan. 4, 1955

2,698,605

PNEUMATIC BOOSTER

Ralph Kress, La Mesa, Calif., assignor to Solar Aircraft Company, San Diego, Calif., a corporation of California Application August 11, 1950, Serial No. 178,952

16 Claims. (Cl. 121—40)

This invention relates to fluid control systems such as pneumatic boosters, and has particular reference to hydropneumatic servo mechanisms capable of both rapid and accurate movement in response to control signals.

My invention in its present embodiment is particularly adapted to provide actuating means for continuously variable area nozzles such as are used in aircraft turboramjet power plants, that is, power plants comprising a turbojet engine in combination with an afterburner assembly as disclosed, for example, in my co-pending application Serial No. 150,127, filed March 17, 1950. It will be understood from the description, however, that the novel mechanisms disclosed herein have a wide range of additional uses, as for example, to actuate aircraft ailerons and flaps, position machine tools relative to work pieces, or actuate machine presses, lifts and the like.

In using such jet power plants it is necessary on occasion to go from military thrust without afterburning to combat thrust with full afterburning in a fraction of a second, during which the flame propagation takes place at near explosive rates. It is important, therefore, that the variable area afterburner nozzle open rapidly and simultaneously with the initiation of afterburning so that there will be no radical change in pressure on the gases coming from the upstream turbojet engine. Rapid action is extremely desirable on such occasions since the afterburner is provided to give the aircraft pilot an added measure of safety in case of a wave-off from a carrier or small emergency field, or where an additional burst of speed is needed in combat.

In addition, it is desirable that the nozzle be sensitive to minor adjustments occasioned by changes in air speed, altitude, barometric pressure and ratio between main engine thrust and afterburner thrust. To obtain proper nozzle control it is therefore necessary to provide a rapid acting servo device which will deliver considerable force and at the same time be capable of fine adjustment at any and every position of its working stroke or actuating movement. The terms "working stroke" and "actuating movement" as used herein are intended to include a full stroke of the actuating element in either direction as well as any portion thereof.

This need for a servo device especially adapted for aircraft use, and particularly for an afterburner nozzle control has not been successfully met by any of the methods or devices of prior art. The control devices used in the machine tool art, for example, are usually too large and heavy for the amount of power delivered and therefore unsuited for aircraft. More important, to my knowledge, the machine tool servos are invariably full stroke devices having no provision for locking the actuating cylinder piston in any desired position, an absolute necessity for successful aircraft use as pointed out hereinbefore.

Because of the obvious disadvantages of machine tool servos for aircraft use, the development in this art has tended away from such devices and has been directed toward straight pneumatic, hydraulic or electric devices. Pneumatic devices, however, have the disadvantage of springiness of action and therefore lack accuracy, while hydraulic devices have generally been considered too slow where rapid actuation is required. Considerable effort has been expended developing electric servos for aircraft use, and during the Second World War the Germans even tried step-up and step-down rotary motion in the control of wing flaps and other such devices. However, in spite of the development of extremely high speed electrical dynamos, motors and braking devices the relatively large weight of such systems, their cost, and the service difficulties involved have been serious disadvantages particularly in smaller aircraft.

To overcome these disadvantages of the prior art my invention provides a hydropneumatic servo mechanism or booster capable of both rapid and accurate motion, the direction, speed, and magnitude of which are determined by corresponding characteristics of a manually or automatically generated control signal, and particularly adapted in size and weight for aircraft use. This mechanism comprises an air-hydraulic actuating cylinder and an air-hydraulic valve, in a novel combination which has all the benefits of hydraulic actuation and yet retains all the advantages of pneumatic actuation, and in which the disadvantage of springiness in pneumatic actuation is eliminated by locally controlled hydraulic damping, and the disadvantage of sluggishness in hydraulic actuation is eliminated by utilizing the speed of pneumatic action. Furthermore, in this novel servo mechanism, the actuating cylinder is reversible, can be locked in any position, and can be regulated as to speed. Thus, the system is under complete control of the operator, or actuating mechanism at all times; and, in addition, though compact and lightweight, is capable of delivering a large amount of power.

With these and other considerations in view it is a prime object of this invention to provide a novel servo mechanism particularly adapted for aircraft use.

It is a further important object of this invention to provide a small, lightweight servo actuator that is capable of delivering a large amount of power.

Another object is to provide an improved servo actuator that is simple in design and easily controlled.

It is also an object to provide a novel servo mechanism operable to translate a control signal into an actuating movement which bears a predetermined time and spatial relation to the control signal.

A further object is to provide a servo mechanism capable of both very rapid movement over the full length of stroke, and rapid, though slower vernier movement at any point in the stroke.

A still further object is to provide a servo mechanism having no tendency to hunt or oscillate at either the ends of the stroke or in any intermediate position.

Another important object is to provide a servo mechanism having a positive locking system to prevent override following either rapid or vernier movement of the actuating member.

It is a more specific object to provide a novel servo mechanism having a plurality of separate fluid systems and means to establish and maintain automatically a predetermined pressure relation between the fluid systems.

It is also an object to provide a novel means for eliminating lag or backlash in a servo mechanism.

Other objects and advantages will be apparent from the following description in conjunction with the accompanying drawings and from the appended claims.

The accompanying drawings in which like reference numerals are used to designate similar parts throughout, illustrate the preferred embodiment for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Figure 1 illustrates an elevation partly in section of the forward portion of the actuating cylinder-valve assembly of the preferred embodiment of my invention;

Figure 2 illustrates an elevation partly in section of the rear portion of the actuating cylinder-valve assembly;

Figure 3 illustrates an elevation in section of the actuator valve showing details of the valve arrangement;

Figure 4 illustrates a plan view partly in section of the forward portion of the actuating cylinder-valve assembly;

Figure 5 illustrates a plan view partly in section of the rear portion of the actuating cylinder-valve assembly;

Figure 6 illustrates a detailed section of the pinion-rack assembly, taken along 6—6 of Figure 5;

Figure 7 illustrates a plan view in detail of one of the pinions of Figure 6;

Figure 8 illustrates a view of the edge of the pinion of Figure 7;

Figure 9 illustrates a detailed section of the valve body, taken along line 9—9 of Figure 4; and Figures 10 and 11 diagrammatically illustrate a typical installation of the servo mechanism according to the present invention.

In the drawings, for completeness of illustration, the complete actuator cylinder-valve assembly has been broken at line A—A, the portion to the left of line A—A being illustrated in Figure 1 and the portion to the right, being illustrated in Figure 2. Referring now to both of these figures, the main actuator cylinder is generally indicated at 10 and is provided with two inner sealed stops or walls 12 (Figure 1) and 14 (Figure 2) which, together with sealed end fittings 15 and 16, form within the main cylinder 10 three tandem working cylinders 17. The tandem or series cylinder arrangement provides maximum possible thrust in a compact unit. Located within working cylinders 17 are three pistons 18 which divide the cylinders into forward and rear working chambers 19 and 20, respectively. Piston seals 21 prevent leakage of fluid between the forward and rear chambers, while O rings 22 seal the walls between the tandem cylinders and provide seals for the other joints throughout the assembly. Pistons 18 are moved within their respective cylinders by a compressible fluid such as air which may enter into or exit from the main cylinder 10 through ports 23 and 24, Figure 1. Ports 23 and 24 are connected through sleeves 25 and 26 to the ports 27 and 28, respectively, in each of the three tandem cylinders 17. The connections between sleeves 25 and 26 and their respective cylinder ports 27 and 28 may be of any conventional type of conduit and are not shown in the drawings.

Pistons 18 are fixed upon a movable piston rod 29 which is connected at its right end to actuator link 30, Figure 2. Referring again to Figure 1, the rod 29 is itself a hollow cylinder, and surrounds a second hollow cylinder 32 of smaller diameter which is securely threaded into end fitting 15 at 33. Integral with rod 29 are two stops or walls 34 and 35, sealed with O rings 22 as shown, and slidable on the cylinder 32.

A piston head 36 secured in cylinder 32 is located between stops 34 and 35, and together with the stops forms the hydraulic working chambers 37 and 38 which comprise the hydraulic locking means. Piston head 36 remains in fixed spaced relation with the main actuator cylinder 10 so that movement of rod 29 and stops 34 and 35 therewith causes volume changes in working chambers 37 and 38. The working chamber 37 is connected to an external cylinder port 39 at the forward end of the cylinder by means of an orifice 40 and duct 42 in the wall of cylinder 32. Working chamber 38 is connected to an external cylinder port 44 at the forward end of the cylinder by means of orifice 45 and duct 46 in the center of cylinder 32. These ports are in turn connected through the actuator valve in a manner hereinafter explained, to a source of hydraulic fluid such as oil, or other suitable fluid, preferably of low viscosity.

The actuator valve, generally indicated at 50, Figures 1 and 3, is secured to the top of cylinder as shown in Figure 4 by any suitable means as screws 52. As will be seen from Figures 1 and 3, valve 50 is mounted so that the external valve ports 54 and 55 are aligned with main cylinder ports 23 and 24. Fitted within valve 50, Figure 3, is a cylindrical liner 56, lapped on its interior to provide a finished fit for the hollow valve piston 57 which moves laterally covering or uncovering the ports in liner 56 as will be described.

An oil reservoir 58 for the closed circuit pressurized hydraulic damping or locking system is located in the upper portion of the valve body as shown in Figure 3. This reservoir is filled through the port 59 normally closed by a bleeder plug 60, having a vent hole 61. One wall of the reservoir consists of the plunger 62 which is reciprocably received within a machined cylinder 58a an enlarged extension 58b of which is held in place by a snap ring 58c. Rigidly attached to plunger 62 is a shaft 64 reciprocably received within a central aperture in a valve seal 66 which latter is held in place by a snap ring 66a. Plunger 62 is urged in a leftward direction, as viewed in Figure 3, by air pressure on its right side, as will be explained, and by a light spring 65 mounted on shaft 64 between the plunger and the valve seal 66. Movement of the plunger to the right is limited by a snap ring 62a received within a slot in cylinder extension 58b. Rigidly attached to valve seal 66 as by weld 66b is a cylindrical sleeve 67 extending rearwardly from the valve body 50. Plunger shaft 64 extends through and slightly beyond the sleeve 67, Figures 1 and 4, and is provided at its free end with a plunger handle 68 integral with shaft 64 and at right angles to its axis. Handle 68 normally slides freely in opposed notches 69 in cylindrical sleeve 67 allowing the plunger 62 to move freely to its equilibrium position, thereby maintaining the hydraulic pressure substantially equal to or higher than the air pressure at all times depending upon the strength of spring 65.

The hydraulic system is thus pressurized and the formation of air pockets in the hydraulic system is effectively prevented. This assures the desired positive clamping and locking action of the incompressible fluid. Further the possibility of leakage of air into the hydraulic system is minimized since the hydraulic system is maintained at a pressure which is preferably slightly higher than that of the air circuit.

Oil from reservoir 58 passes by means of the passage 70 in valve 50 and the apertures 72 in liner 56 into three annular oil pockets 74, 75 and 76 formed in valve piston 57. As is most clearly shown in Figure 3, passage of the oil between the three pockets is made possible by a plurality of communicating passageways 77 and 78 drilled through the pocket separating walls 79 and 80 respectively. When valve piston 57 is in its closed position as shown in Figure 3, the walls 79 and 80 close off ports in the liner 56 leading to annular oil passages 82 and 84 in the valve body. The passages 82 and 84 are connected by means of ducts 85 and 86 to the external valve ports 87 and 88, respectively, Figures 1 and 4, and ports 87 and 88 are in turn connected by flexible hoses 89 and 90 to external cylinder ports 39 and 44, hereinbefore described. Thus, when valve piston 57 is in its closed position the oil in working chambers 37 and 38 is locked therein, and since the oil is incompressible the piston rod 29 is locked against movement.

The air or gas system for the servo device is not a closed circuit like the hydraulic damping system since it requires compressed air from an outside source. The source may be any suitable aircraft compressed air supply as for example the compressor outlet of the primary jet engine. This air is supplied to the valve 50 through the fitting 92 threaded into external valve port 94. Port 94 opens into the air chamber 95, Figure 3, one side of which is formed by the plunger 62 so that the air under pressure will aid spring 65 to bias the plunger to the left as previously explained. The air chamber 95 communicates by means of a passage 96 in valve body 50 with the annular air pocket 97 formed in valve piston 57. The pocket 97 communicates with a second annular air pocket 98 by means of a horizontal duct 99, Figure 4, in the valve body which terminates in communicating passage 99a. The intermediate valve piston walls 100 and 101 separating oil pockets 74 and 76 from air pockets 98 and 97, respectively, are provided with O rings 22 to prevent leakage between the air and oil portions of the valve.

If the valve piston 57 is moved to the right as viewed in Figure 3, air in the pocket 97 will be allowed to pass into an annular passage 102 which communicates with the valve port 55. This will allow the air to pass through port 55, main cylinder port 24, Figure 1, and into the three tandem cylinders 17 through ports 28, as hereinbefore described. This will force actuator pistons 18 to the left causing air to the left of the pistons to exhaust through ports 27 and main cylinder port 23 which communicates with port 54. Port 54, Figure 3, in turn communicates with the annular passage 104 in the valve body. Since valve piston 57 has moved rightwardly, the passage 104 is also in communication with the annular pocket 105 formed at the forward end of the valve piston. Thus, the exhausting air will pass out through pocket 105 into an exhaust air chamber 106 which vents it into the atmosphere through the exhaust port 107 and fitting 108.

In the reverse case, movement of valve piston 57 to the left will place air pocket 98 in communication with passage 104 so that the air will pass through ports 54, 23 and 27 into the three tandem cylinders, forcing actuator pistons 18 to the right. Movement of pistons 18 to the right will cause air to the right of the pistons to exhaust through ports 28, 24 and 55. Since valve piston 57 has moved to the left, port 55 will communicate with the annular pocket 109 formed between the rear end of the valve piston and the valve liner 56. Pocket 109 is in open communication with a slightly larger annular pocket 110 formed by the end of valve piston 57 and valve body 50. Pocket 110 is in turn in open communication an annular space 111 between the inside wall of hollow valve piston 57 and a pilot rod 112, to be explained. Thus, the exhausting air will pass out through the pockets 109 and 110, space 111, pocket 105, chamber 106 and port 107 to the outlet fitting 108.

Referring now to Figures 2, 3 and 5, it will be seen that the pilot rod 112, which passes freely through valve piston 57 is secured at its rear end to a pilot rack 116 having a double row of rack teeth. Two idler pinions 117, Figures 5 and 6, are constantly in mesh with each row of rack teeth, and these pinions are mounted on a common crosshead 118. Crosshead 118 is secured by some means as screws 119 to the upper and lower channel members 120 and members 120 are in turn fixed to rear extension of valve piston 57 by suitable means such as screws 122, Figure 3. Also in constant mesh with pinions 117 are a pair of outer racks 124, each having a single row of rack teeth. Racks 124 are supported for reciprocable movement in a pair of roller tracks 125 mounted as shown in Figure 6 in a rearward extension 126 of the valve body 50. Racks 124 are secured together at their ends by means of a yoke 127 which is integral with a hollow rod 128 extending through and beyond the sealed end 129 of the valve extension 126. Rod 128 is in turn secured in a fixed relation to the actuator link 30 by means of a feed back link 130 as is best shown in Figure 2.

It should be noted in connection with the idler pinions 117 that each pinion is actually a split gear, Figures 6 and 8, with the two halves spring loaded with an internal coil spring 132 having a loading of .33 inch pounds and having its opposite ends inserted in recesses in the opposite halves. The purpose of this construction is to take out any "slap" or back lash between the pinions 117 and racks 116 and 124 at the end of relative movement between them.

Referring now to Figures 3, 4 and 9, a pin bolt 134 is shown threaded into a tapped hole 135 in the valve body 50. Bolt 134 is provided to properly locate valve liner 56 and also to limit the travel of valve piston 57. As is best shown in Figure 9, bolt 134 passes through the tapped hole 135 and a matching bore 136 in the liner 56 to locate the liner. Projecting further in, the end of the bolt extends into a slot 137, Figures 3 and 9, in an arcuate extension 114 of the valve piston 57 thereby limiting the axial motion of the piston. Bolt 134 does not, however, interfere with the free movement of pilot rod 112 passing through the extension 114. Slot 137 limits the travel of valve piston 57 to from ⅛ to ¼ of an inch right and left of its neutral position in which all valves are closed.

Operation

To initially fill or to refill the reservoir 58 and oil system, the plunger 62 is pulled back by pulling the plunger handle 68 out of the slots 69 until it can be given a quarter turn and left in the cocked position shown in dotted lines in Figure 1, where it is held by the sleeve 67. Oil is then poured into the system through the port 59 and, with the feedback link 130 disconnected and the valve 50 open, the main cylinder actuator rod 30 is pushed back and forth drawing in oil from the reservoir 58 and discharging air which bubbles up through the oil in the reservoir and out the port 59. When the system is completely filled with oil and no bubbles remain, the bleeder plug 60 is inserted part way so that the vent hole is still exposed. The plunger handle 68 is then released and spring 65, exerting a loading of about 5 pounds, urges plunger 62 towards the left forcing oil up into the bleeder plug thereby forcing any remaining air out through the vent 61. As soon as oil begins to flow through this hole, bleeder plug 61 is tightened down sealing the hydraulic system.

As pointed out before, the air for the pneumatic system may be tapped off any convenient aircraft source such as the primary engine compressor discharge. This air will then be conducted by a suitable conduit to the fitting 92 at the air inlet so that the system will be ready for use as soon as the air is turned on the exhaust air from 107 offers no disposal problem and may be led off by any suitable means and exhausted to the atmosphere.

When the servo actuator is installed for use, the actuator link 30 will be connected by any suitable means to the nozzle, flap, aileron or other object to be controlled. The positioning of link 30 will be proportional to an input signal received by the pilot rod 112. The signal generating mechanism which conveys the input signal from the operator to rod 112 plays no part of this invention; however, any conventional mechanism such as a straight lever controlled mechanical linkage or a reversible electric motor can be used with satisfactory results.

In the particular form of the invention embodied herein, a signal received by the pilot rod 112 will be transmitted by its rack 116 to the pinions 117 and crosshead 118. Since the racks 124 are held relatively fixed at this instant, pinion 117 will travel along them moving the crosshead and valve piston 57, attached thereto by means of channels 120, half as far and in the same direction as the movement of pilot rod 112. This action causes the valve ports to open and air to enter the actuator cylinder, which air forces the pistons 18 and actuator link 30 to move in the opposite direction. At the same time, movement of pistons 18 and piston rod 29 will cause the oil in the hydraulic working chambers 37 and 38 to pass through the open valve passages and adjust itself from one working cylinder to the other. The movement of pistons 18 and actuator link 30 in the opposite direction is fed back through feedback link 130 to the rod 128 and rack 124. Since rack 116 attached to pilot rod 112 is held relatively fixed after the input signal has caused its initial movement, motion of racks 124 in the opposite direction will be transmitted through pinions 117 to the crosshead 118 returning it towards its original position. As soon as this position is reached, the valve 50 is again closed and the passage of air and oil to and from the actuator is stopped. Thus, any movement of rod 112 through an $x$ distance in one direction will be accompanied by a movement of crosshead 118 and valve piston 57, causing the actuator link 30 to move in the opposite direction and continue to do so until it has travelled an identical $x$ distance, at which instant the feedback racks 124 have returned the crosshead to its normal position and reclosed the valve. The moment the valve is closed, further transfer of oil from one hydraulic working chamber to the other is prohibited, and there can be no further movement of piston rod 29 and actuator link 30. The link 30 is, therefore, securely locked in the position to which it has been moved and will stay in that position until a new input signal is received. Because further transfer of hydraulic fluid is prohibited the instant link 30 has moved the $x$ distance, and because this fluid locked in working chambers 37 and 38 is incompressible, any oscillation or hunting which might otherwise occur due to the compressibility of the air, will be eliminated.

It will be apparent that if the pilot rod 112 is given a continuous movement in one direction rather than the incremental movement thus far described, the same operating relation will be maintained between the movable elements with the same operating result. Although displacement of the valve piston 57 is limited by the pin bolt 134, the movement of the pilot rod 112, which is mechanically linked to the valve piston 57, is not similarly limited, since slight displacement of the valve piston 57 will initiate a substantially instantaneous reverse movement of the link 30 and feed back mechanism. Thus the racks 124 and 116 will move in opposite directions at the same velocity holding crosshead 118 and piston valve stationary until the movement of the pilot rod 112 is discontinued at which time the piston valve will move to its closed position. If the velocity of the link 30 exceeds the velocity of the pilot rod 112 the piston valve 57 will be moved toward its closed position, automatically decreasing the velocity of the link 30. If the reverse condition obtains, the velocity of the link 30 will be immediately increased. In either case, an immediate automatic correction will be effected to equalize the velocities of the pilot rod and the actuating link. Thus, it will be seen that the movement of the actuating link corresponds to the movement of the pilot rod to velocity as well as distance. It will be understood that by simply varying the gear-rack tooth ratio of the pinion and rack, the link 30 can be made to move any fraction or multiple of the input distance of pilot rod 112 and that the velocities of the pilot rod and actuating link can be established at any desired value.

Referring now to Figures 10 and 11, 150 indicates generally an aircraft having a wing 151 and an aileron 152 pivotally mounted therein in conventional manner. The servo mechanism, described above and indicated generally at 153, is mounted by any suitable means within the wing 151. Air under pressure is supplied to the servo mechanism through a conduit 154 from any suitable source such as a bleed from the supercharger if the aircraft is powered by a reciprocating engine, a bleed from the compressor section of a jet power plant or from an auxiliary compressor unit. The exhaust air is conducted to any convenient point of disposal on the aircraft through a conduit 155. An input or control signal is supplied to the servo mechanism by means of conventional linkage actuated by a control element in the pilot's compartment such as a control stick 156. The resultant motion of the actuator link 30 is transmitted through a bellcrank 157 to a link 158 which is pivotally attached to the lower surface of the aileron. It will be apparent from the above described operation of the servo mechanism that the movements of the aileron will duplicate or be proportional to the movement of the pilot's control stick both in magnitude and velocity. Further, since the aileron is positively locked in position after each movement, even severe buffeting of the aileron will not override the pilot's control nor cause objectionable random movement of the control stick. It is to be understood that the opposite aileron (not shown) will be equipped with a similar control mechanism to produce the desired co-ordinated movement of the aileron. It is also to be understood that the control system here shown may readily adapted for actuation of other aircraft control surfaces such as the flaps, rudder, or elevators and, as mentioned above, is ideally suited for positioning a continuously variable area nozzle of a jet engine equipped with an afterburner.

From the foregoing, it will be apparent that the novel servo mechanism embodied herein combines the advantages of pneumatic and hydraulic actuation to provide a servo actuator which is capable of rapid and accurate motion and at the same time has no tendency to hunt or oscillate at the ends of its movement. This servo mechanism is also reversible and can be locked in any desired position. Because it accurately responds to any given input signal, it is capable of being regulated as to speed to give rapid power strokes or slower vernier adjustment or any desired combination thereof. Thus, by means of an easily moved and controlled pilot rod, a large force is produced capable of doing many kinds of work. The hydraulic system is unaffected by ambient conditions since it is a sealed system under pressure, and this feature insures proper operation under any condition of flight. At the same time, the oil of the hydraulic system serves as a lubricant for many of the working parts of the actuator. This servo mechanism has been provided particularly as a small light weight actuator for aircraft use, but is capable of many other uses, and the valve and actuating cylinder can also be disconnected when desired for use as separate actuators.

The invention may be embodied in other specific forms without departing from the spirit or essential characteristics thereof. The single embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid control system, an actuator cylinder having a hollow piston rod with a plurality of pistons secured thereto, means to supply a compressed fluid to said cylinder externally of said piston rod to actuate said pistons to move said piston rod, and hydraulic locking means within said hollow piston rod to automatically and positively lock said rod in any position to which it is moved comprising means secured to said rod internally thereof to form a closed fluid cylinder, a fixed piston within said rod dividing said closed fluid cylinder into a plurality of closed locking chambers, and valve means to control the flow of fluid between said closed locking chambers.

2. In a fluid control system; an actuator comprising a plurality of working cylinders in series, a hollow piston rod common to all of said working cylinders, and a plurality of pistons, one for each of said working cylinders, mounted on said rod; means to supply a compressed fluid to said cylinders to actuate said pistons to move said piston rod; and hydraulic locking means automatically and positively locking said piston rod in any position to which it is moved comprising a pair of intercommunicating hydraulic working chambers formed by a pair of stops secured to said hollow piston rod and a relatively stationary piston head therebetween.

3. In a fluid control system, an actuator cylinder having a hollow piston rod and a plurality of double-acting pistons secured thereto externally thereof, a normally closed valve to control the passage of a compressed gas to and from said cylinder, means to open said valve in response to an input signal to move said piston rod, and hydraulic locking means within said hollow piston rod to automatically and positively lock said rod in any position to which it is moved comprising means secured to said piston rod internally thereof to form a closed fluid cylinder, a fixed double-acting piston in said closed fluid cylinder, and valve means to control the flow of fluid between the opposite ends of said closed fluid cylinder.

4. A fluid control system as described in claim 3, wherein said actuator cylinder is comprised of a plurality of working cylinders in series, there being one of said pistons for each working cylinder, and said piston rod being common to all of said cylinders.

5. In a servo actuator, an actuator cylinder having a hollow piston rod and a plurality of pistons secured thereto, a normally closed valve to control the passage of a compressed fluid to and from said cylinder, means to open said valve in response to an input signal to move said piston rod, means operably connected to said piston rod to close said valve as said rod reaches the end of its movement, and hydraulic locking means within said piston rod to automatically and positively lock said rod in any position to which it is moved comprising means secured to said rod internally thereof to form a closed fluid cylinder, a fixed piston in said closed fluid cylinder, and valve means to control the flow of fluid between the opposite ends of said closed fluid cylinder.

6. A servo actuator as described in claim 5, wherein said actuator cylinder is comprised of a plurality of working cylinders in series, there being one of said pistons for each working cylinder, and said piston rod being common to all of said cylinders.

7. In a servo actuator, an actuator cylinder having hollow piston rod therein; at least one piston mounted externally of said piston rod within said cylinder; a normally closed valve having a valve piston to control the passage of the compressed fluid to and from said cylinder; means to move said valve piston in a given direction in response to an input signal, whereby said valve is opened to cause a working stroke of said piston rod in the reverse direction; means operably connected to said piston rod to return said valve piston to its initial position and thereby close said valve as said piston rod reaches the end of its working stroke; and hydraulic locking means within said piston rod to automatically and positively lock said rod at the end of its stroke comprising a pair of cylinder heads mounted internally of said rod to form a closed fluid cylinder therein, a fixed piston within said cylinder to divide said cylinder into a pair of hydraulic working chambers, said chambers communicating with each other through said valve, whereby when said valve is opened and said piston rod is performing a working stroke the volume of said chambers will change causing hydraulic fluid to flow freely through said valve from one chamber to the other, and when said valve is closed passage of hydraulic fluid through the valve is prohibited thereby locking said piston rod against movement.

8. A servo actuator as described in claim 7, wherein the length of the working stroke is proportional to the said input signal.

9. A servo actuator as described in claim 7, wherein said means to move said valve piston is a pilot rod operably connected to a rack, said rack being in engagement with at least one pinion operably connected to said valve piston, whereby movement of said pilot rod is transmitted through said rack and pinion to said valve piston.

10. The servo actuator as described in claim 9 together with means associated with said pinion to eliminate back lash between said rack and said pinion.

11. A servo actuator as described in claim 7, wherein said means operably connected to said piston rod is a feedback link operably connecting said piston rod with a plurality of racks in engagement with a plurality of pinions operably connected to said valve piston, whereby movement of said piston rod is transmitted through said racks and pinions to said valve piston.

12. In a servo actuator, an actuator cylinder having a hollow piston rod therein, a source of compressed gas to actuate said hollow piston rod, a normally closed valve to control the passage of the gas to and from said cylinder, means to open said valve in response to a predetermined input signal to cause a working stroke of said hollow piston rod, means operably connected to said hollow piston rod to return said valve to its closed position as said hollow piston rod reaches the end of its working stroke, and a sealed hydraulic locking system comprising a pair of cylinder heads mounted internally of said piston rod and forming with a fixed piston a pair of hydraulic working chambers wholly within said hollow piston rod interconnected through said valve whereby when said valve is closed transfer of hydraulic fluid between said chambers is prohibited and said hollow piston rod is locked against movement.

13. In a fluid control system; a power cylinder; a piston in said power cylinder, locking means operably connected to said piston; means for supplying a first fluid to said power cylinder to effect displacement of said piston; means for supplying a second fluid to said locking means to lock said piston; common means for controlling the flow of the first and second fluids in predetermined timed relation whereby said locking means is effective to lock said piston in its displaced position; a reservoir for said second fluid, said reservoir having a movable wall having one surface in contact with said second fluid; and means to supply said first fluid to the other surface of said movable wall whereby the second fluid is continuously subjected to a pressure at least equal to the pressure of said first fluid.

14. In a servo actuator; an actuating element movable through a working stroke; a locking element; a compressible fluid circuit adapted, when energized, to move said actuating element; an incompressible fluid circuit for selectively operating said locking element to prevent movement of said actuating element; a reservoir for said incompressible fluid; a movable wall in said reservoir having one surface in contact with said incompressible fluid, and means to conduct said compressible fluid under pressure to the other surface of said wall whereby the incompressible fluid is continuously subjected to a pressure substantially equal to the pressure of the compressible fluid.

15. An actuator for a fluid control system comprising; an elongated hollow chamber; relatively fixed annular inner walls dividing said chamber into a plurality of working cylinders; a hollow piston rod reciprocably supported on the inner surfaces of said annular walls; a plurality of pistons mounted on said rod, one of said pistons being disposed in each of said cylinders; a plurality of annular stops mounted on said piston rod internally thereof and forming a locking chamber; a fixed piston reciprocably received within said piston rod between said stops to divide said locking chamber into a plurality of locking cylinders; means to selectively connect the opposite ends of said working cylinders to a source of compressed fluid or exhaust to move said piston rod, said means being operable to interconnect said locking cylinders during said movement and prohibit communication therebetween at the end of said movement whereby said piston is automatically and positively locked at the end of said movement.

16. An actuator for a fluid control system comprising; inner and outer fixed annular members; a relatively movable and annular element coaxial with said fixed members and interposed therebetween; means secured to said outer member slidably engaging said movable element and dividing the space therebetween into a plurality of working cylinders; pistons on said relatively movable element, each of said pistons extending into one of said working cylinders; a pair of cylinder heads mounted internally of said relatively movable member and slidably engaging said inner fixed member to form a locking chamber, a piston mounted on said inner fixed member in sliding contact with said relatively movable member and dividing said locking cylinder into a plurality of locking chambers; means for selectively connecting the opposite ends of said working cylinders to a source of compressed fluid and exhaust to effect displacement of said relatively movable element said means being operative to interconnect said locking chambers only during the displacement of said movable member.

References Cited in the file of this patent

UNITED STATES PATENTS

| | | |
|---|---|---|
| 489,130 | Melling | Jan. 3, 1893 |
| 887,518 | Raub | May 12, 1908 |
| 1,119,324 | Sprater | Dec. 1, 1914 |
| 1,248,357 | McEntire | Nov. 27, 1917 |
| 1,619,799 | Rounds et al. | Mar. 1, 1927 |
| 1,734,795 | Claxton | Nov. 5, 1929 |
| 1,742,946 | Bertram | Jan. 7, 1930 |
| 1,824,833 | Nordberg | Sept. 29, 1931 |
| 2,316,320 | Dewandre | Apr. 13, 1943 |
| 2,436,009 | Kremiller | Feb. 17, 1948 |
| 2,450,031 | Berger | Sept. 28, 1948 |
| 2,462,994 | Price | Mar. 1, 1949 |
| 2,523,696 | Hadfield | Sept. 26, 1950 |

FOREIGN PATENTS

| 723 | Great Britain | 1882 |